(12) United States Patent
Strack

(10) Patent No.: US 9,091,395 B2
(45) Date of Patent: Jul. 28, 2015

(54) PROCESS FOR FORMING A VESSEL

(75) Inventor: Ludger Strack, Heidenrod (DE)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 12/720,961

(22) Filed: Mar. 10, 2010

(65) Prior Publication Data

US 2011/0220660 A1 Sep. 15, 2011

(51) Int. Cl.
*F17C 1/02* (2006.01)
*F17C 1/06* (2006.01)

(52) U.S. Cl.
CPC ............ *F17C 1/06* (2013.01); *F17C 2201/0109* (2013.01); *F17C 2201/056* (2013.01); *F17C 2203/0604* (2013.01); *F17C 2203/066* (2013.01); *F17C 2203/0607* (2013.01); *F17C 2203/0619* (2013.01); *F17C 2203/0624* (2013.01); *F17C 2203/0636* (2013.01); *F17C 2203/0663* (2013.01); *F17C 2203/0673* (2013.01); *F17C 2205/0305* (2013.01); *F17C 2205/0323* (2013.01); *F17C 2205/0397* (2013.01); *F17C 2209/2127* (2013.01); *F17C 2209/234* (2013.01); *F17C 2221/011* (2013.01); *F17C 2221/012* (2013.01); *F17C 2221/033* (2013.01); *F17C 2223/013* (2013.01); *F17C 2223/0123* (2013.01); *F17C 2223/0153* (2013.01); *F17C 2223/035* (2013.01); *F17C 2223/036* (2013.01); *Y02E 60/321* (2013.01)

(58) Field of Classification Search
CPC .................. F17C 2201/00; F17C 2201/0104; F17C 2201/0109; F17C 2209/22
USPC .......................... 220/586–588, 590; 156/169
See application file for complete search history.

(56) References Cited

U.S. PATENT DOCUMENTS

| | | | | |
|---|---|---|---|---|
| 5,518,141 | A * | 5/1996 | Newhouse et al. | 220/586 |
| 6,227,402 | B1 * | 5/2001 | Shimojima et al. | 220/581 |
| 7,032,767 | B2 | 4/2006 | Funck | |
| 7,861,887 | B2 * | 1/2011 | Ota et al. | 220/581 |
| 2003/0111473 | A1 * | 6/2003 | Carter et al. | 220/586 |
| 2004/0026431 | A1 * | 2/2004 | Jones | 220/588 |
| 2009/0152278 | A1 * | 6/2009 | Lindner | 220/589 |
| 2010/0170906 | A1 * | 7/2010 | Iida | 220/586 |
| 2010/0258573 | A1 * | 10/2010 | Weber | 220/586 |
| 2010/0276434 | A1 * | 11/2010 | Berger et al. | 220/586 |

* cited by examiner

*Primary Examiner* — Luan K Bui
*Assistant Examiner* — Rafael Ortiz
(74) *Attorney, Agent, or Firm* — Fraser Clemens Martin & Miller LLC; James D. Miller

(57) ABSTRACT

A vessel and method for forming the vessel is disclosed, the vessel having a hollow liner, at least one boss, and a filament wound outer shell, wherein at least a portion of the hollow liner if formed by at least one of an co-extrusion blow film molding process, a thermoplastic foiling process, and a coating process.

20 Claims, 2 Drawing Sheets

PROCESS FOR FORMING A VESSEL

FIELD OF THE INVENTION

The invention relates to a vessel and more particularly to a pressure vessel and a method for forming the vessel, wherein the vessel includes a hollow liner formed from an extruded film tube and a pair of end caps.

BACKGROUND OF THE INVENTION

Presently, there are a variety of vessels designed to contain various fluids such as compressed natural gas (CNG), hydrogen gas for use in a fuel cell, and the like, for example. A common technique for storing the fluid is in a lightweight, high pressure vessel resistant to punctures. Traditionally, such vessels are divided into four types. A Type I vessel is a metal vessel. A Type II vessel is also a metal vessel, the vessel having an outer composite shell disposed on a cylindrical section thereof. A Type III vessel consists of a liner produced from a metal such as steel and aluminum, for example, and an outer composite shell that encompasses the liner and militates against damage thereto. A Type IV vessel is substantially similar to the Type III vessel, wherein the liner is produced from a plastic.

Typically, the liner is manufactured using conventional forming processes such as a welding process, a rotational molding process, and other similar processes, for example. During the welding process, multiple components of the liner are welded together at seams of the components. The weld seams, however, may not be fluid-tight and permit permeation of the stored fluid from the vessel. Further, the welding process limits the types of material which can be used to form the liner. On the other hand, the rotational molding process is slower and produces a liner having an adverse thickness. During the rotational molding process, the liner is formed by disposing bosses in a die cavity with a polymer resin, heating the mold while being rotated to cause the resin to melt and coat walls of the die cavity, cooling the die, and removing the molded liner. The bosses, however, may not properly adhere to the liner resulting in formation of a space therebetween. If the bosses are not properly adhered to the liner, a fluid-tight seal between the bosses and the liner may not form. Without a fluid-tight seal, the contents of the vessel may escape therefrom to the atmosphere. To ensure fluid-tight seals between the bosses and the liner, adhesives, heat welding, and other similar processes may be employed. Alternatively, an adapter device as disclosed in U.S. Pat. No. 7,032,767, hereby incorporated herein by reference in its entirety, may also be used to ensure a fluid-tight seal. Such processes and additional devices may be time consuming and require manual process steps, thereby resulting in an increased cost to produce the vessel.

It would be desirable to develop a vessel and a method for producing the vessel including a thin hollow liner and at least one boss, wherein an efficiency of the method is optimized and a cost thereof is minimized.

SUMMARY OF THE INVENTION

In accordance and congruent with the present invention, a vessel and a method for producing the vessel including a hollow liner and at least one boss, wherein an efficiency of the method is optimized and a cost thereof is minimized, has surprisingly been discovered.

In one embodiment, a method of forming a vessel, the method comprises the steps of: forming a hollow liner including a first end cap and a second end cap, wherein the first end cap includes a first boss and the second end cap includes a second boss; and forming an outer shell over at least a portion of the hollow liner and at least a portion of the bosses.

In another embodiment, a method of forming a vessel, the method comprises the steps of: forming a first end cap of a hollow liner including an interfacial layer and a first boss; forming a main body of the hollow liner; disposing the first end cap on the main body of the hollow liner; and forming an outer shell over the main body and at least a portion of the first end cap of the hollow liner.

In another embodiment, a vessel comprises: a first end cap including an interfacial layer and a first boss; a thin main body abutting at least a portion of the first end cap; and an outer shell formed around at least a portion of the first end cap and the main body.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
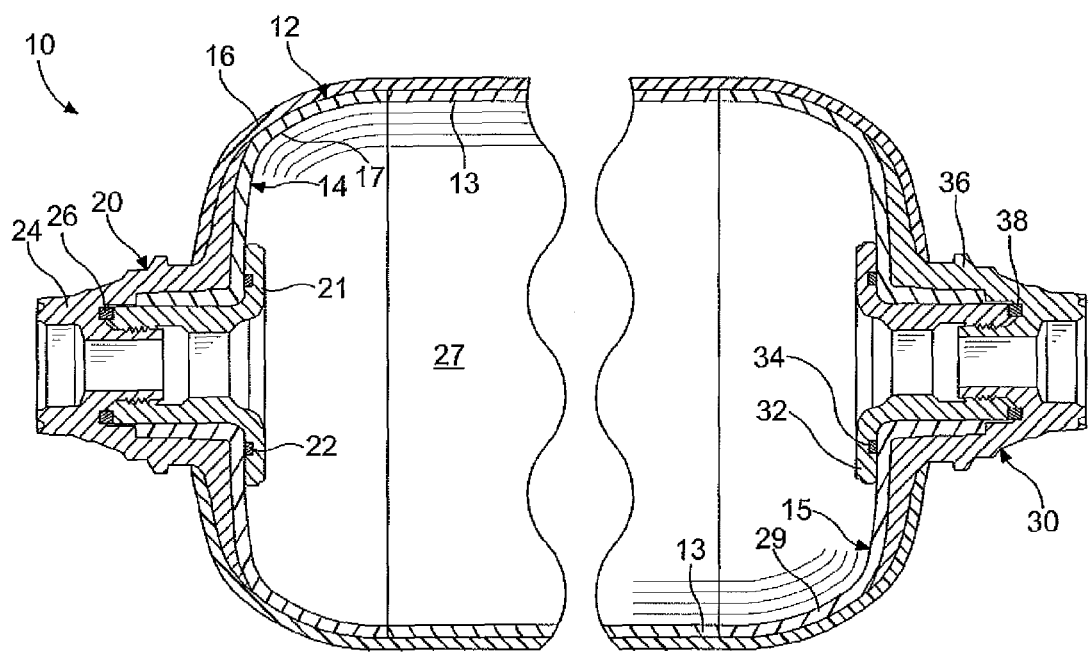
FIG. 1 is a cross-sectional elevational view of a vessel according to an embodiment of the invention.

FIG. 1 illustrates a vessel 10. The vessel 10 includes a hollow liner 12 having a thin main body 13, a first end cap 14, and a second end cap 15. In the embodiment shown, the vessel 10 further includes an outer shell 16. The vessel 10 has a substantially cylindrical shape and is adapted to hold a pressurized fluid (not shown). It is understood that the vessel 10 may have any shape as desired, and the vessel 10 may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example. As shown, the main body 13 of the liner 12 is formed from a moldable material such as polyethylene, polypropylene, polyethylene terephthalate (PET), ethylene vinyl alcohol, and a polyamide, for example. The main body 13 is formed from a thin film having a desired thickness. In a non-limiting example, the main body 13 is about 0.1 mm to about 0.5 mm thick.

The first end cap 14 of the liner 12 includes an interfacial layer 17 and a first divided boss 20. As shown, the interfacial layer 17 of the first end cap 14 is formed from a moldable material such as polyethylene, PET, polyoxymethylene (POM), ethylene vinyl alcohol, and a polyamide, for example. A first component 21 of the first divided boss 20 substantially abuts at least a portion of a first surface of the interfacial layer 17. A first gasket 22 such as a polymeric o-ring, for example, is disposed between the first component 21 and the interfacial layer 17 to form a substantially fluid-tight seal therebetween. It is understood that the first gasket 22 may be disposed elsewhere between the first component 21 and the interfacial layer 17 of the liner 12, if desired.

A second component 24 of the first divided boss 20 substantially abuts at least a portion of a second surface of the interfacial layer 17. The second component 24 cooperates with the first component 21 to secure the interfacial layer 17 therebetween. A second gasket 26 such as a polymeric o-ring, for example, is disposed between the first component 21 and the second component 24 of the first divided boss 20 to form a substantially fluid-tight seal therebetween. The second component 24 receives a fluid-communication element (not shown) in a central aperture formed therein for communicating with an interior 27 of the vessel 10 such as a valve, a fitting, a hose, a nozzle, a conduit, and the like, for example. It is understood that the second gasket 26 may be disposed elsewhere between the first component 21 and the second component 24, if desired. The gaskets 22, 26 may be any conventional gasket formed from a material which facilitates forming a fluid-tight seal between two contacting surfaces. The first component 21 and the second component 24 of the first divided boss 20 are separately produced finishes that form an opening into the interior 27 of the vessel 10, and are typically shaped to receive a closure element (not shown). The vessel 10 may include any number of divided bosses, as desired. The components 21, 24 of the first divided boss 20 may be formed from any suitable material having desired properties such as a metal, for example.

The second end cap 15 of the liner 12 includes an interfacial layer 29 and a second divided boss 30. As shown, the interfacial layer 29 of the second end cap 15 is formed from a moldable material such as polyethylene, PET, POM, ethylene vinyl alcohol, and a polyamide, for example. A first component 32 of the second divided boss 30 substantially abuts at least a portion of a first surface of the interfacial layer 29. A third gasket 34 such as a polymeric o-ring, for example, is disposed between the first component 32 and the interfacial layer 29 to form a substantially fluid-tight seal therebetween. It is understood that the third gasket 34 may be disposed elsewhere between the first component 32 and the interfacial layer 29, if desired.

A second component 36 of the second divided boss 30 substantially abuts at least a portion of a second surface of the interfacial layer 29. The second component 36 cooperates with the first component 32 to secure the interfacial layer 29 therebetween. A fourth gasket 38 such as a polymeric o-ring, for example, is disposed between the first component 32 and the second component 36 of the second divided boss 30 to form a substantially fluid-tight seal therebetween. The second component 36 receives a fluid-communication element (not shown) in a central aperture formed therein for communicating with an interior 27 of the vessel 10 such as a valve, a fitting, a hose, a nozzle, a conduit, and the like, for example. It is understood that the fourth gasket 38 may be disposed elsewhere between the first component 32 and the second component 36, if desired. The gaskets 34, 38 may be any conventional gasket formed from a material which facilitates forming a fluid-tight seal between two contacting surfaces. The first component 32 and the second component 36 of the second divided boss 30 are separately produced finishes that form an opening into the interior 27 of the vessel 10, and are typically shaped to receive a closure element (not shown). The vessel 10 may include any number of divided bosses, as desired. The components 32, 36 of the second divided boss 30 may be formed of a metal or another conventional material having desired properties.

In the embodiment shown, the outer shell 16 of the vessel 10 substantially abuts at least a portion of the second surface of the liner 12. A portion of the outer shell 16 is disposed on the second component 24 of the first divided boss 20 and the second component 36 of the second divided boss 30. The outer shell 16 is typically formed by a filament winding and curing process. When the outer shell 16 is formed by the filament winding and curing process, the outer shell 16 may be formed from a carbon fiber, a glass fiber, a composite fiber, and a fiber having a resin coating, for example. It is understood that the outer shell 16 can be formed by other methods as desired.

To form the vessel 10, the thin main body 13 of the liner 12 is formed by a co-extrusion blow film molding process. After the main body 13 of the liner 12 has been formed, the first end cap 14 and the second end cap 15 of the liner 12 are disposed on opposing ends thereof. The first end cap 14 and the second end cap 15 are formed by any conventional forming process such as an injection molding process, a thermoforming process, and the like, for example. The outer shell 16 is then formed around the main body 13 and at least a portion of the end caps 14, 15 using the filament winding and curing process. Once the outer shell 16 is cured, the vessel 10 is complete.

Alternatively, the liner 12 is formed by a thermoplastic foiling and sealing process. During the thermoplastic foiling and sealing process, a thin foil sheet is formed by a thermoplastic foiling process. It is understood that the thin foil sheet can be a single layer, flexible, foil sheet or a multi-layer, flexible, foil sheet as desired. It is further understood that an additional coating process may be employed to apply to the thin foil sheet a material to militate against a permeation of the pressurized fluid therethrough such as a hydrogen barrier material, for example. The end caps 14, 15 are then disposed on opposing ends of the thin foil sheet. The thin foil sheet is wound around the first end cap 14 and the second end cap 15. A seem formed at contacting edges of the foil sheet is then sealed to form the main body 13. Thereafter, seems formed at contacting surfaces of the main body 13 and the respective end caps 14, 15 are sealed to form the liner 12. It is understood that the seems can be sealed by any suitable method as desired such as by a welding process, a heat-sealing process, and the like, for example. The first end cap 14 and the second end cap 15 are formed by any conventional forming process such as an injection molding process, a thermoforming process, and the like, for example.

Figure 2:
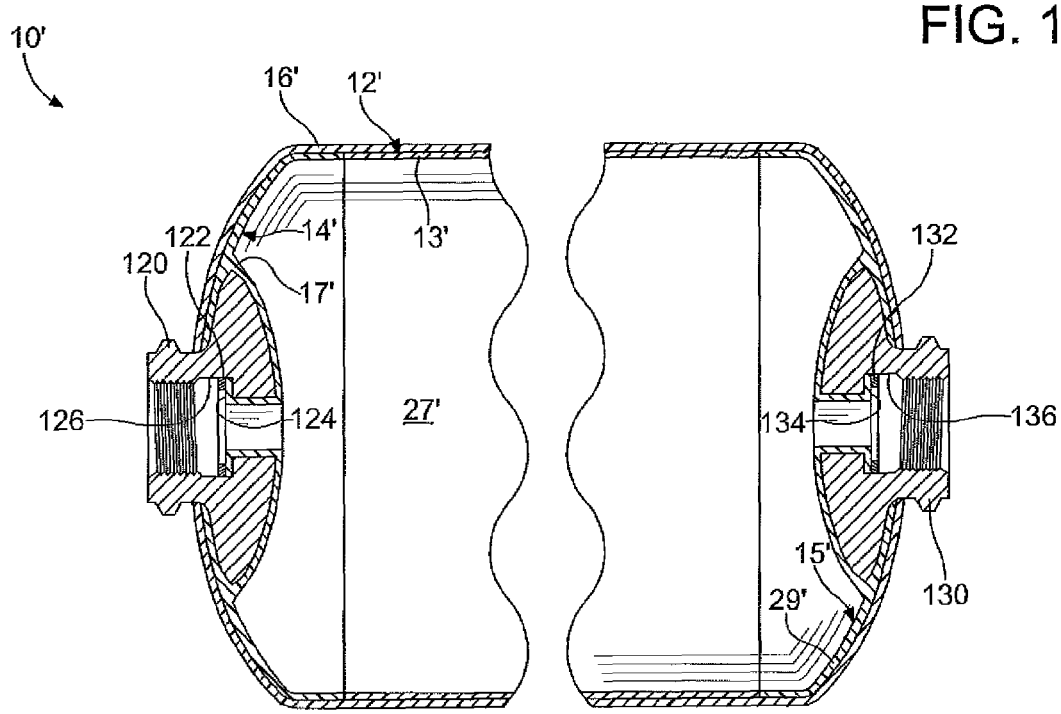
FIG. 2 is a cross-sectional elevational view of a vessel according to another embodiment of the invention.

FIG. 2 shows a vessel 10' according to another embodiment of the invention. The embodiment of FIG. 2 is similar to the vessel 10 of FIG. 1, except as described hereinafter. Similar to the structure of FIG. 1, FIG. 2 includes the same reference numerals accompanied by a prime (') to denote similar structure.

The vessel 10' includes a hollow liner 12' having a thin main body 13', a first end cap 14', and a second end cap 15'. In the embodiment shown, the vessel 10' further includes an outer shell 16'. The vessel 10' has a substantially cylindrical shape and is adapted to hold a pressurized fluid (not shown). It is understood that the vessel 10' may have any shape as desired, and the vessel 10' may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example. As shown, the main body 13' of the liner 12' is formed from a moldable material such as polyethylene, PET, ethylene vinyl alcohol, and a polyamide, for example. The main body 13' is formed from a thin film having a desired thickness. In a non-limiting example, the main body 13' is about 0.1 mm to about 0.5 mm thick.

The first end cap 14' of the liner 12' includes an interfacial layer 17' and a boss 120. The interfacial layer 17' is formed around at least a portion of the boss 120. As shown, the interfacial layer 17' is formed from a moldable material such as a thermoplastic (e.g. polycarbonate, polyethylene, PET, POM, ethylene vinyl alcohol, a polyamide, and a fiberglass thermoplastic), for example. The boss 120 receives a fluid-communication element (not shown) in a central aperture formed therein for communicating with an interior 27' of the vessel 10' such as a valve, a fitting, a hose, a nozzle, a conduit, and the like, for example. A first gasket 122 such as a polymeric O-ring, for example, may be disposed adjacent an annular shoulder 124 of the interfacial layer 17' and an inner surface 126 of the boss 120. The gasket 122 is adapted to form a fluid-tight seal between the interfacial layer 17' and the fluid-communication element. It is understood that the gasket 122 may be disposed elsewhere between the interfacial layer 17' and the fluid-communication element, if desired. The gasket 122 may be any conventional gasket formed from a material which facilitates forming a fluid-tight seal between two contacting surfaces. The boss 120 is typically a separately produced finish that forms an opening into the interior 27' of the vessel 10', and is shaped to receive a closure element (not shown). The vessel 10' may include any number of bosses, as desired. The boss 120 may be formed from any suitable material having desired properties such as a metal, for example.

The second end cap 15' of the liner 12' includes an interfacial layer 29' and a boss 130. The interfacial layer 29' is formed around at least a portion of the boss 130. As shown, the interfacial layer 29' is formed from a moldable material such as a thermoplastic (e.g. polycarbonate, polyethylene, PET, POM, ethylene vinyl alcohol, a polyamide, and a fiberglass thermoplastic), for example. The boss 130 receives a fluid-communication element (not shown) in a central aperture formed therein for communicating with the interior 27' of the vessel 10' such as a valve, a fitting, a hose, a nozzle, a conduit, and the like, for example. A second gasket 132 such as a polymeric o-ring, for example, may be disposed adjacent an annular shoulder 134 of the interfacial layer 29' and an inner surface 136 of the boss 130. The gasket 132 is adapted to form a fluid-tight seal between the interfacial layer 29' and the fluid-communication element. It is understood that the gasket 132 may be disposed elsewhere between the interfacial layer 29' and the fluid-communication element, if desired. The gasket 132 may be any conventional gasket formed from a material which facilitates forming a fluid-tight seal between two contacting surfaces. The boss 130 is typically a separately produced finish that forms an opening into the interior 27' of the vessel 10', and is shaped to receive a closure element (not shown). The vessel 10' may include any number of bosses, as desired. The boss 130 may be formed from any suitable material having desired properties such as a metal, for example.

In the embodiment shown, the outer shell 16' of the vessel 10' substantially abuts at least a portion of the liner 12'. A portion of the outer shell 16' is disposed on the boss 120 and the boss 130. The outer shell 16' is typically formed by a filament winding and curing process. When the outer shell 16' is formed by the filament winding and curing process, the outer shell 16' may be formed from a carbon fiber, a glass fiber, a composite fiber, and a fiber having a resin coating, for example. It is understood that the outer shell 16' can be formed by other methods as desired.

To form the vessel 10', the thin main body 13' of the liner 12' is formed by a co-extrusion blow film molding process. After the main body 13' of the liner 12' has been formed, the first end cap 14' and the second end cap 15' of the liner 12' are disposed on opposing ends thereof. The first end cap 14' and the second end cap 15' are formed by any conventional forming process such as an injection molding process, a thermoforming process, and the like, for example. The outer shell 16' is then formed around the main body 13' and at least a portion of the end caps 14', 15' using the filament winding and curing process. Once the outer shell 16' is cured, the vessel 10' is complete.

Alternatively, the liner 12' is formed by a thermoplastic foiling and sealing process. During the thermoplastic foiling and sealing process, a thin foil sheet is formed by a thermoplastic foiling process. It is understood that the thin foil sheet can be a single layer, flexible, foil sheet or a multi-layer, flexible, foil sheet as desired. It is further understood that an additional coating process may be employed to apply to the thin foil sheet a material to militate against a permeation of the pressurized fluid therethrough such as a hydrogen barrier material, for example. The end caps 14', 15' are then disposed on opposing ends of the thin foil sheet. The thin foil sheet is wound around the first end cap 14' and the second end cap 15'. A seem formed at contacting edges of the foil sheet is then sealed to form the main body 13'. Thereafter, seems formed at contacting surfaces of the main body 13' and the respective end caps 14', 15' are sealed to form the liner 12'. It is understood that the seems can be sealed by any suitable method as desired such as by a welding process, a heat-sealing process, and the like, for example. The first end cap 14' and the second end cap 15' are formed by any conventional forming process such as an injection molding process, a thermoforming process, and the like, for example.

Figure 3:
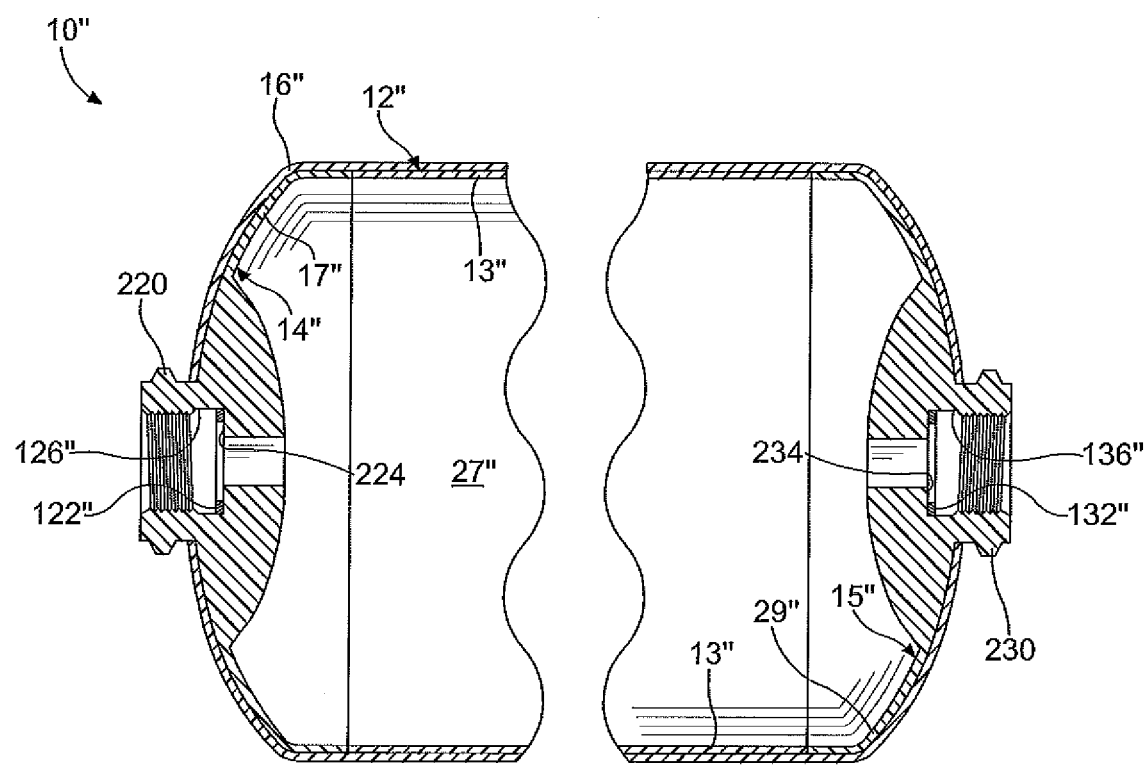
FIG. 3 is a cross-sectional elevational view of a vessel according to another embodiment of the invention.

FIG. 3 shows a vessel 10" according to another embodiment of the invention. The embodiment of FIG. 3 is similar to the vessel 10, 10' of FIGS. 1 and 2, except as described hereinafter. Similar to the structure of FIGS. 1 and 2, FIG. 3 includes the same reference numerals accompanied by a prime (") to denote similar structure.

The vessel 10" includes a hollow liner 12" having a thin main body 13", a first end cap 14", and a second end cap 15". In the embodiment shown, the vessel 10" further includes an outer shell 16". The vessel 10" has a substantially cylindrical shape and is adapted to hold a pressurized fluid (not shown). It is understood that the vessel 10" may have any shape as desired, and the vessel 10" may include additional layers such as a barrier layer, a foil layer, a porous permeation layer, and the like, as desired. The pressurized fluid may be any fluid such as a gas (e.g. hydrogen gas and oxygen gas), a liquid, and both a liquid and a gas, for example. As shown, the main body 13" of the liner 12" is formed from a moldable material such as polyethylene, PET, ethylene vinyl alcohol, and a polyamide, for example. The main body 13" is formed from a thin film having a desired thickness. In a non-limiting example, the main body 13" is about 0.1 mm to about 0.5 mm thick.

The first end cap 14" of the liner 12" includes an interfacial layer 17" and a boss 220. As shown, the interfacial layer 17" and the boss 220 are integrally formed. It is understood that the boss 220 may be formed from a reinforced material if desired. The boss 220 receives a fluid-communication element (not shown) in a central aperture formed therein for communicating with an interior 27" of the vessel 10" such as a valve, a fitting, a hose, a nozzle, a conduit, and the like, for example. A first gasket 122" such as a polymeric o-ring, for example, may be disposed adjacent an annular shoulder 224 and an inner surface 126" of the boss 220. The gasket 122" is adapted to form a fluid-tight seal between the boss 220 and the fluid-communication element. It is understood that the gasket 122" may be disposed elsewhere between the boss 220 and the fluid-communication element, if desired. The gasket 122" may be any conventional gasket formed from a material which facilitates forming a fluid-tight seal between two contacting surfaces. The vessel 10" may include any number of bosses, as desired. The end cap 14" may be formed from any suitable material having desired properties such as a metal, for example.

The second end cap 15" of the liner 12" includes an interfacial layer 29" and a boss 230. As shown, the interfacial layer 29" and the boss 230 are integrally formed. It is understood that the boss 230 may be formed from a reinforced material if desired. The boss 230 receives a fluid-communication element (not shown) in a central aperture formed therein for communicating with the interior 27" of the vessel 10" such as a valve, a fitting, a hose, a nozzle, a conduit, and the like, for example. A second gasket 132" such as a polymeric o-ring, for example, may be disposed adjacent an annular shoulder 234 and an inner surface 136" of the boss 230. The gasket 132" is adapted to form a fluid-tight seal between the boss 230 and the fluid-communication element. It is understood that the gasket 132" may be disposed elsewhere between the boss 230 and the fluid-communication element, if desired. The gasket 132" may be any conventional gasket formed from a material which facilitates forming a fluid-tight seal between two contacting surfaces. The vessel 10" may include any number of bosses, as desired. The end cap 15" may be formed from any suitable material having desired properties such as a metal, for example.

In the embodiment shown, the outer shell 16" of the vessel 10" substantially abuts at least a portion of the liner 12". A portion of the outer shell 16" is disposed on the bosses 220, 230 of the respective end caps 14", 15". The outer shell 16" is typically formed by a filament winding and curing process. When the outer shell 16" is formed by the filament winding and curing process, the outer shell 16" may be formed from a carbon fiber, a glass fiber, a composite fiber, and a fiber having a resin coating, for example. It is understood that the outer shell 16" can be formed by other methods as desired.

To form the vessel 10", the thin main body 13" of the liner 12" is formed by a co-extrusion blow film molding process. After the main body 13" of the liner 12" has been formed, the first end cap 14" and the second end cap 15" of the liner 12" are disposed on opposing ends thereof. The first end cap 14" and the second end cap 15" are formed by any conventional forming process such as a casting process, for example. The outer shell 16" is then formed around the main body 13" and at least a portion of the end caps 14", 15" using the filament winding and curing process. Once the outer shell 16" is cured, the vessel 10" is complete.

Alternatively, the liner 12" is formed by a thermoplastic foiling and sealing process. During the thermoplastic foiling and sealing process, a thin foil sheet is formed by a thermoplastic foiling process. It is understood that the thin foil sheet can be a single layer, flexible, foil sheet or a multi-layer, flexible, foil sheet as desired. It is further understood that an additional coating process may be employed to apply to the thin foil sheet a material to militate against a permeation of the pressurized fluid therethrough such as a hydrogen barrier material, for example. The end caps 14", 15" are then disposed on opposing ends of the thin foil sheet. The thin foil sheet is wound around the first end cap 14" and the second end cap 15". A seem formed at contacting edges of the foil sheet is then sealed to form the main body 13". Thereafter, seems formed at contacting surfaces of the main body 13" and the respective end caps 14", 15" are sealed to form the liner 12". It is understood that the seems can be sealed by any suitable method as desired such as by a welding process, a heat-sealing process, and the like, for example. The first end cap 14" and the second end cap 15" are formed by any conventional forming process such as a casting process, for example.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of forming a vessel, the method comprising the steps of:
    forming a first end cap of a hollow liner, the first end cap including an interfacial layer and a first boss, the interfacial layer defined by an inner surface and a second surface opposing the inner surface, and terminating in an end surface;
    forming a main body of the hollow liner in a step separate from the forming of the first end cap of the hollow liner, the main body having an inner surface and a first end of the main body terminating in an end surface;
    disposing the first end cap on the main body of the hollow liner, wherein the end surface of the interfacial layer abuts the end surface of the main body to define an interface between the first end cap and the main body of the hollow liner; and
    forming an outer shell over the main body, the interface, at least a portion of the first boss, and at least a portion of the first end cap of the hollow liner to secure the main body to the first end cap, wherein the inner surface of the interfacial layer and the inner surface of the main body together define an interior cavity of the vessel for containing a pressurized fluid, wherein the inner surface of the main body is a major surface of the interior cavity and the inner surface of the interfacial layer is a minor surface of the interior cavity, wherein at least a first portion of the first boss is disposed between the outer shell and the second surface of the interfacial layer in an axial direction of the first boss and a second portion of the first boss is disposed adjacent the inner surface of the interfacial layer, wherein the interfacial layer is in direct contact with the first portion of the first boss and the second portion of the first boss, and wherein the outer shell is in direct contact with an outer surface of the first boss and the interfacial layer.

2. The method according to claim 1, wherein the interfacial layer of the first end cap cooperates with the first boss to form a substantially fluid-tight seal therebetween.

3. The method according to claim 1, wherein the interfacial layer of the first end cap and the first boss are integrally formed.

4. The method according to claim 1, wherein the first end cap is formed by one of an injection molding process and a thermoforming process.

5. The method according to claim 1, wherein the main body is formed by at least one of a co-extrusion blow film molding process, a thermoplastic foiling process, and a coating process.

6. The method according to claim 1, wherein the outer shell is formed by a filament winding and curing process.

7. The method according to claim 1, further comprising the steps of forming a second end cap of the hollow liner, the second end cap including an interfacial layer and a second boss; disposing the second end cap on the main body of the hollow liner; and forming the outer shell over at least a portion of the second end cap of the hollow liner.

8. The method according to claim 7, wherein the interfacial layer of the second end cap cooperates with the second boss to form a substantially fluid-tight seal therebetween.

9. The method according to claim 7, wherein the interfacial layer of the second end cap and the second boss are integrally formed.

10. The method according to claim 7, wherein the second end cap is formed by one of an injection molding process and a thermoforming process.

11. A vessel comprising:
a first end cap including an interfacial layer and a first boss, the interfacial layer defined by an inner surface and a second surface opposing the inner surface, and terminating in an end surface, the first boss having a first component and a second component, wherein the second component abuts an inner surface of the first component and an outer surface of the first component;
a thin main body having an inner surface and a first end terminating in an end surface, the end surface at the first end of the main body abutting the end surface of the interfacial layer of the first end cap to define an interface between the first end cap and the main body; and
an outer shell formed around at least a portion of the first end cap, the interface, at least a portion of the first boss, and the main body and securing the main body to the first end cap with at least a portion of the first boss disposed between the outer shell and second surface of the interfacial layer in an axial direction of the first boss, wherein the inner surface of the interfacial layer and the inner surface of the main body together define an interior cavity of the vessel for containing a pressurized fluid, wherein the inner surface of the main body is a major surface of the interior cavity and the inner surface of the interfacial layer is a minor surface of the interior cavity, and wherein the outer shell is in direct contact with an outer surface of the first boss and the interfacial layer.

12. The vessel according to claim 11, further comprising a second end cap including an interfacial layer and a second boss.

13. The vessel according to claim 12, wherein at least one of the interfacial layer of the first end cap and the first boss are integrally formed and the interfacial layer of the second end cap and the second boss are integrally formed.

14. The vessel according to claim 12, wherein at least one of the first end cap and the second end cap is formed by one of an injection molding process and a thermoforming process.

15. The vessel according to claim 11, wherein the main body is formed by at least one of a co-extrusion blow film molding process, a thermoplastic foiling process, and a coating process.

16. A method of forming a vessel comprising:
disposing a first end cap on a first end of a main body, the first end cap and the main body formed in separate steps, the first end of the main body having an inner surface and a second surface opposing the inner surface, and terminating in an end surface, wherein the first end cap includes a first boss and an interfacial layer having an inner surface and terminating in an end surface, the end surface at the first end of the main body abutting the end surface of the interfacial layer of the first end cap to define a first interface between the first end cap and the main body, wherein the first boss has a first component, a second component, and a first gasket, the first component of the first boss cooperating with the second component of the first boss to secure the interfacial layer of the first end cap therebetween, and the first gasket of the first boss disposed between the first component of the first boss and the interfacial layer of the first end cap in an axial direction of the first boss to form a substantially fluid tight seal therebetween;
disposing a second end cap on a second end of the main body, the second end cap and the main body formed in separate steps, the second end disposed opposite the first end of the main body, the second end of the main body having an inner surface and terminating in an end surface, wherein the second end cap includes a second boss and an interfacial layer terminating in an end surface, the end surface at the second end of the main body abutting the end surface of the interfacial layer of the second end cap to define a second interface between the first end cap and the main body, wherein the second boss has a first component, a second component, and a first gasket the first component of the second boss cooperating with the second component of the second boss to secure the interfacial layer of the second end cap therebetween and the first gasket of the second boss disposed between the first component of the second boss and the interfacial layer of the second end cap in an axial direction of the second boss to form a substantially fluid tight seal therebetween; and
forming an outer shell around the main body, at least a portion of the first boss, at least a portion of the second boss, the first interface, the second interface, and at least a portion of the first end cap and at least a portion of the second end cap, to secure the main body to the first end cap, wherein the inner surfaces of the interfacial layers and the inner surface of the main body together define an interior cavity of the vessel for containing a pressurized fluid, wherein the inner surface of the main body is a major surface of the interior cavity and the inner surfaces of the interfacial layers are a minor surface of the interior cavity, wherein at least a portion of each of the first boss and the second boss is disposed between the outer shell and the second surface of the interfacial layer in an axial direction of the boss, and wherein the outer shell is in direct contact with an outer surface of the first boss, an outer surface of the second boss, the interfacial layer of the first end cap, and the interfacial layer of the second end cap.

17. The method of claim 16, further comprising forming the main body by a coextrusion blow film molding process prior to the disposing step.

18. The method of claim 16, further comprising forming the first end cap and the second cap by one of an injection molding and a thermoforming process prior to the disposing step.

19. The method of claim 16, wherein forming an outer shell around the main body and at least a portion of the first end cap and at least a portion of the second end cap comprises a filament winding and curing process.

20. The method of claim 16, wherein the first boss includes a second gasket disposed between and in direct contact with the first component of the first boss and the second component of the first boss in an axial direction of the first boss to form a substantially fluid-tight seal therebetween.

* * * * *